United States Patent Office 3,446,558
Patented May 27, 1969

---

3,446,558
METHOD FOR MEASURING THE CHARACTERISTICS OF A GAS
Stuart L. Seaton, Hampton, Va., assignor to the United States of America as represented by the Administrator of the National Aeronautics and Space Administration
Filed Dec. 8, 1965, Ser. No. 512,562
Int. Cl. G01n 21/26
U.S. Cl. 356—104                              1 Claim

ABSTRACT OF THE DISCLOSURE

A device to aid in simultaneously determining the density, velocity and temperature of a streaming gas. The beams of first and second lasers, having different frequencies, are directed into a small region of the streaming gas. A receiver is aimed at the small region of the gas for receiving the difference frequency scattered by the particles in the gas and producing an electrical signal therefrom. Means are connected to the output of the receiver for recording the magnitude, frequency and spectral distribution of the electrical signal. From these recordings, the recordings of the magnitudes of the beams of the first and second lasers, and the calibrations of the first and second lasers, the density, velocity and temperature of the streaming gas can be determined.

---

The invention described herein may be manufactured and used by or for the Government of the United States of America for governmental purposes without the payment of any royalties thereon or therefor.

The invention relates generally to a method of and apparatus for measuring the characteristics of a gas and more specifically concerns a method of and apparatus for simultaneously measuring the density, velocity, and temperature of a streaming gas.

An object of the invention is to provide a method of and apparatus for simultaneously measuring the density, velocity and temperature of a streaming gas.

Another object of this invention is to provide an improved method of and apparatus for measuring the density of a gas.

A further object of this invention is to provide a method of and apparatus for measuring the velocity of a streaming gas.

Still another object of this invention is to provide a method of and apparatus for measuring the temperature of a gas.

Other objects and advantages of this invention will further become apparent hereinafter and in the drawings, in which.

Figure 1:
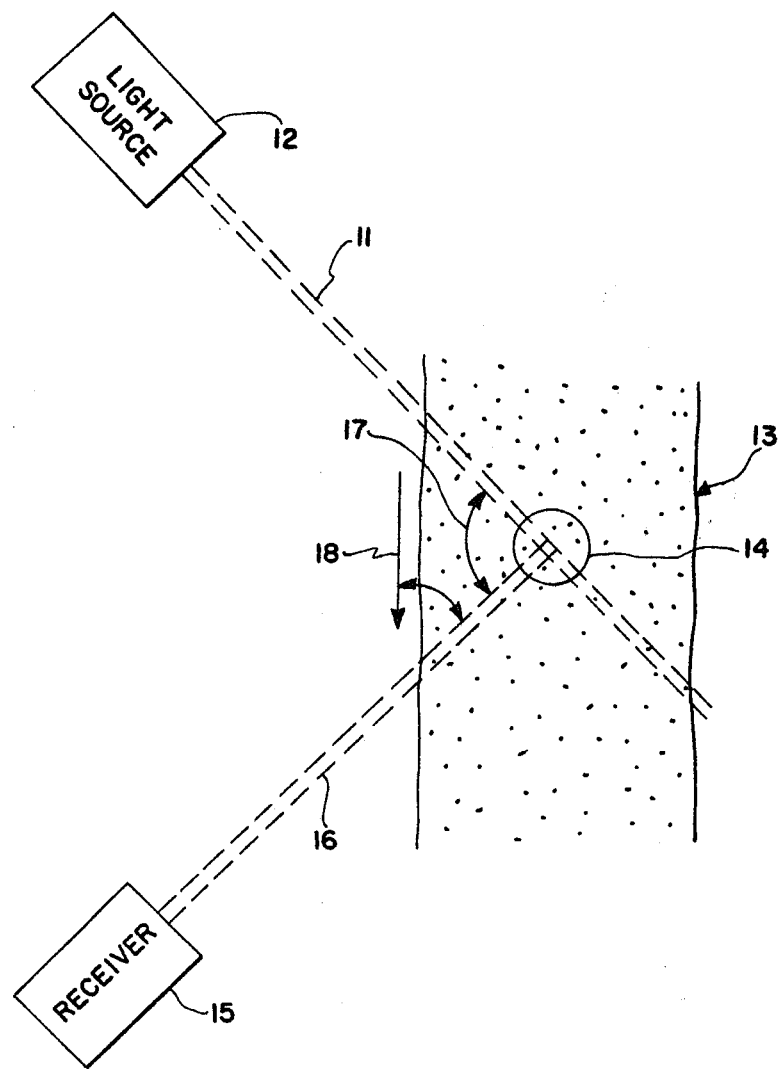
FIG. 1 is a schematic diagram for the purpose of explaining the operating principles of this invention.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

The operating principles of this invention will first be described while referring to FIGS. 1 and 2, then the specific embodiments of the invention shown in FIGS. 3, 4, and 5 will be described.

If a narrow beam of light 11 from a light source 12 in FIG. 1 is directed into a gas 13, it is well known that the light in beam 11 will be scattered by the gas particles. If a small area 14 of gas 13 through which beam 11 passes is viewed by a small angle receiver 15, the receiver will receive a beam of light 16 containing the light scattered by the gas particles in gas 13. The magnitude of the light in beam 16 received by receiver 15 is proportional to the density of gas 13. The constant of proportionality between the density of gas 13 and the magnitude of beam 16 is determined by many factors such as the magnitude of beam 11, the angle 17 between beam 11 and beam 16, the distance from area 14 to receiver 15, the polarizability of gas 13 and the wavelength of the light in beam 11.

If gas 13 does not have a streaming velocity, then the frequency of the light in beam 16 is equal to the frequency of the light in beam 11. However, if gas 13 has a streaming velocity in the direction indicated by arrow 18, beam 16 will have a frequency different from the frequency of beam 11 by an amount determined by the direction and velocity of flow of the gas. This frequency difference is due to the Doppler effect and is proportional to the velocity of the gas.

In addition to the streaming velocity of gas 13, each particle in the gas will have randomly directed velocities caused by the temperature of the gas. As a result of the randomly directed velocities of the gas particles there will be a difference in spectral distribution between beam 16 and beam 11. That is, the spectral distribution of beam 16 will be broader than the spectral distribution of beam 11. This spectral broadening, caused by the randomly directed velocities of the gas, is proportional to the absolute temperature of the gas.

Figure 2:
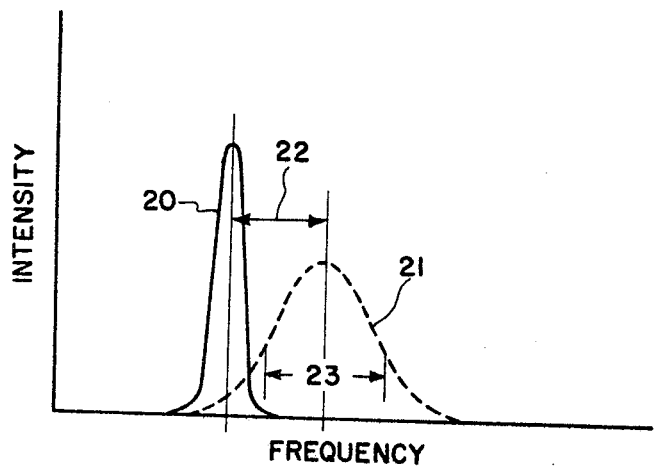
FIG. 2 is a graph for the purpose of explaining the operating principles of this invention.

The relation of beam 16 in FIG. 1 to the density, velocity and temperature of gas 13 can best be understood by referring to the intensity versus frequency graph shown in FIG. 2. Curve 20 is the intensity versus frequency curve for beam 11 and curve 21 is the intensity versus frequency curve for beam 16. The amplitude of curve 21 is proportional to the density of gas 13. Obviously, the constant of proportionality includes the amplitude of curve 20. The frequency difference 22 between curves 20 and 21 is proportional to the velocity of the gas. The width 23 of curve 21 at its one-half power point or any other convenient point above the frequency axis is proportional to the temperature of the gas. Consequently, if light source 12 produces an output in accordance with curve 20 and receiver 15 receives scattered light in accordance with curve 21 and the output of receiver is recorded, the recording can be analyzed to simultaneously determine the density, velocity and temperature of gas 13.

Figure 3:
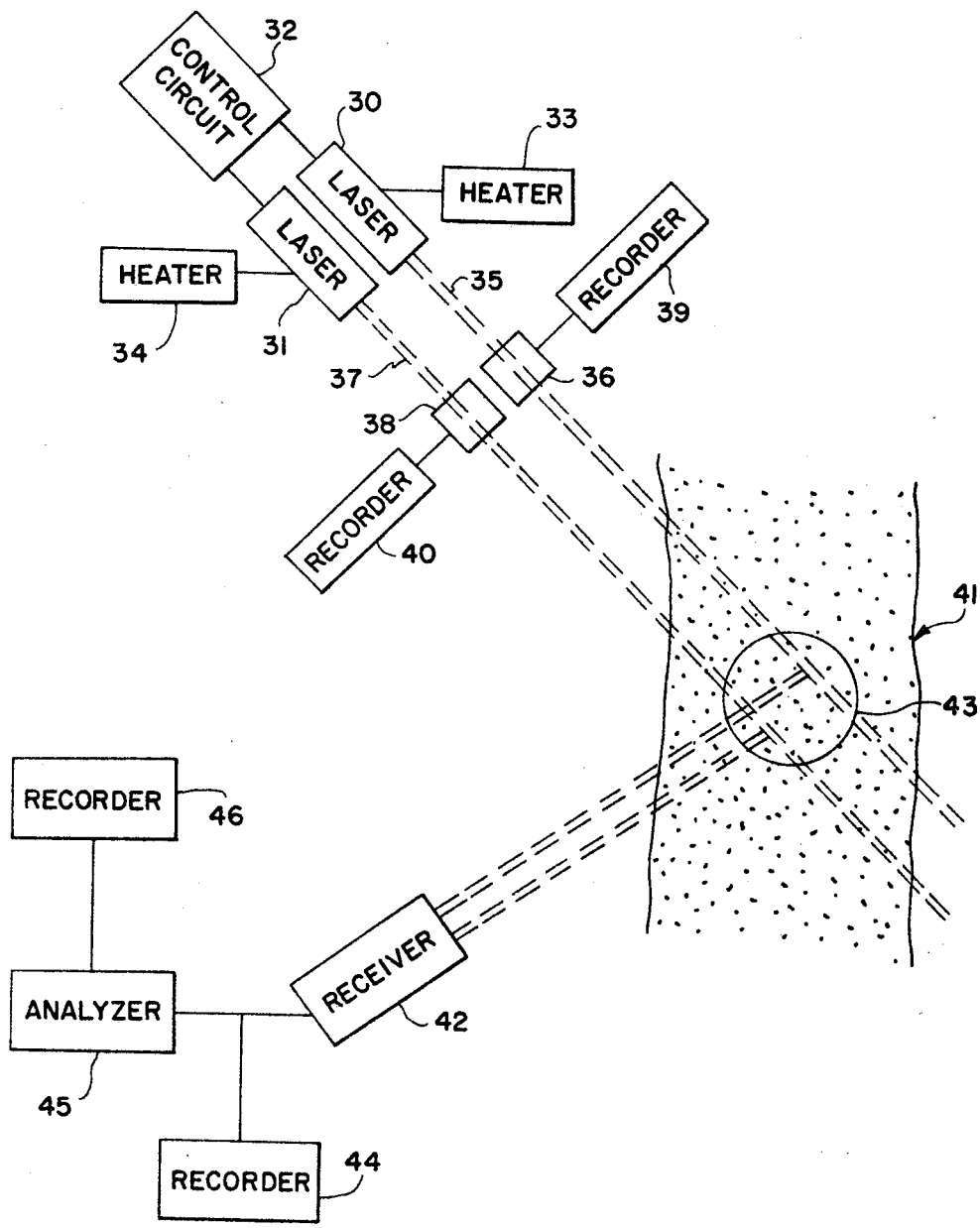
FIG. 3 is a block diagram of a preferred embodiment of this invention.

In FIG. 3 there is shown a preferred embodiment of the invention that operates in accordance with the principles discussed above. The light source consists of two ruby lasers, 30 and 31. Lasers 30 and 31 are the pulse type and are operated in synchronism by means of a control circuit 32. Control circuit 32 can be a pulse source that applies pulses to lasers 30 and 31 at the same times. A heater 33 is connected to laser 30 and a heater 34 is connected to laser 31 to apply different amounts of heat to the two lasers. As is well known, the frequency of a ruby laser can be shifted over a narrow range by adjusting the temperature of the ruby. Consequently, since lasers 30 and 31 are operating at different temperatures, there will be a small difference in their output frequencies. The differences in the output frequencies of lasers 30 and 31 are determined in a laboratory by well-known means for different amounts of heat applied to the two lasers.

The output beam 35 from laser 30 passes through a measuring device 36 and the output beam 37 from laser 31 passes through a measuring device 38. Measuring devices 36 and 38 can be any conventional type for measuring the magnitude of the power output of a laser and at the same time permitting most of the laser energy to pass through it. For example, each of the devices could consist of a Brewster angle window with means such as a photomultiplier tube for measuring the deflected energy. The output from measuring devices 36 and 38 are recorded on recorders 39 and 40, respectively. Laser beams 35 and 37 are parallel and close to each other, and are directed into a gas 41 whose density, velocity and temperature are to be measured. A small angle receiver 42 such as a photomultiplier tube and conventional optics is directed into a small region 43 of gas 41 through which beams 35 and 37 pass. Since the difference frequency between beams 35 and 37 is relatively small, it will be in the range of receiver 42 and will be seen by receiver 42. The amplitude of the output of receiver 42 is recorded by a recorder 44. The output of receiver 42 is also applied to an analyzer 45 which will produce a waveform having the frequency characteristics of the curve 21 in FIG. 2. Analyzers which will perform the function of analyzer 45 are commercially available. The output of analyzer 45 is applied to a recorder 46 where it is recorded. Recorders 39, 40, 44 and 46 can each be an oscilloscope with a Polaroid camera attachment.

The operation of the preferred embodiment of the invention shown in FIG. 3 is performed as follows. The frequency output and spectral distributions of lasers 30 and 31 are determined in a laboratory for different temperatures. Then selected temperatues are applied to lasers 30 and 31 by heaters 33 and 34 such that the difference frequency between the two lasers will be a known value. The spectral distribution of this difference frequency is also determined. The magnitudes of the outputs of the two lasers is then determined from the recordings made by recorders 39 and 40. From the information obtained, a curve similar to curve 20 in FIG. 2 can be drawn. The scattered light in region 43 of gas 41 is then received by receiver 42 and recorded on recorder 44. This will give the magnitude of the curve 21 shown in FIG. 2. Consequently, since the magnitudes of curves 20 and 21 are known, the density of gas 41 can be determined. The output from receiver 42 which is applied through analyzer 45 and recorded on recorder 46 will supply the frequency information for curve 21. Since the frequency of curve 20 has been determined in the laboratory and the frequency of curve 21 can be determined from the recording made by recorder 46, the difference between these two frequencies can be determined which will be proportional to the velocity of gas 41. Also since the dimension 23 of curve 21 can be determined from the recording made by recorder 46 and a similar dimension is determined by the laboratory calibrations run on lasers 30 and 31, the temperature of gas 41 can be determined.

Figure 4:
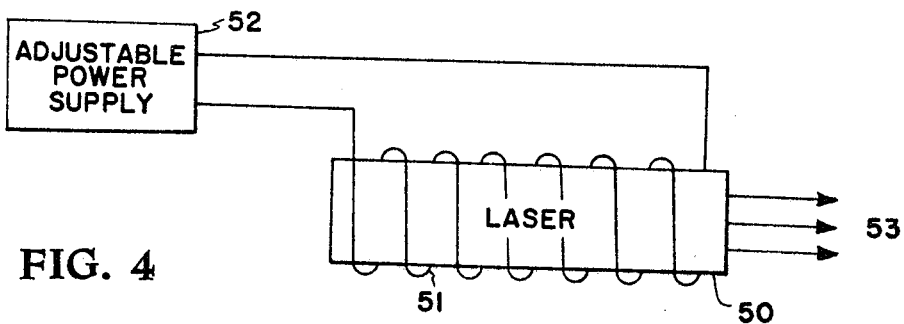
FIG. 4 is a schematic drawing of an element in an alternate embodiment of this invention.

In another embodiment of this invention the modified gas laser shown in FIG. 4 is used in place of the lasers 30 and 31 in FIG. 3. Otherwise, this embodiment of the invention is the same as the one shown in FIG. 3. The embodiment of the invention shown in FIG. 4 consists of an He-Ne or other type gas laser 50. An electromagnetic helix 51 is wrapped around laser 50 and connected across an adjustable regulated D.C. power supply 52. Helix 51 develops a uniform longitudinal magnetic flux throughout the gas in laser 50 which causes Zeeman splitting of the output frequencies from laser 50. The resulting output frequencies 53 from laser 50 to take the place of the frequencies produced by lasers 30 and 31 in FIG. 3. The frequencies 53 produced by laser 50 can be varied by means of the adjustable power supply 52.

Figure 5:
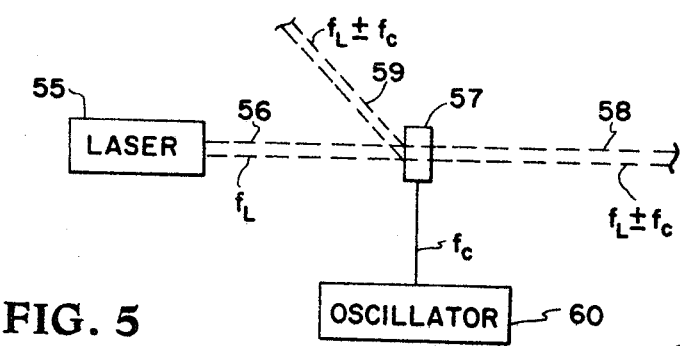
FIG. 5 is a schematic drawing of an element in another alternate embodiment of this invention.

In still another embodiment of this invention, the laser beam modulator shown in FIG. 5, is used in place of lasers 30 and 31 in FIG. 3. Otherwise, this embodiment is also the same as the one shown in FIG. 3. The embodiment of the invention shown in FIG. 5 consists of a laser 55 which produces a beam 56 having a frequency $f_L$. A piezoelectric crystal 57 which can be either a quartz crystal or a tourmaline crystal is located in the path of beam 56 such that a part of beam 56 is transmitted through the crystal and a part of the beam 56 is reflected by the crystal. The transmitted part is beam 58 and the reflected part is beam 59. An oscillator 60 which produces a frequency $f_c$ that is close to the natural frequency of crystal 57 is connected across the electrical axis of crystal 57. As is well known in the crystal art, crystal 57 will oscillate at the frequency $f_c$. Due to the change in refraction of crystal 57 caused by its oscillations transmitted beam 58 has frequencies $f_L \pm f_c$, and due to the Doppler effect reflected beam 59 also has frequencies $f_L \pm f_c$. The frequencies in either beam 58 or beam 59 can take the place of the frequencies produced by lasers 30 and 31 in FIG. 3.

The advantages of this invention are that it provides improved methods and means for measuring the density, velocity and temperature of a streaming gas in which all of these characteristics of the gas can be measured simultaneously.

It is to be understood that the form of the invention herewith shown and described is to be taken as a preferred embodiment. Various changes may be made in the shape, size and arrangement of parts. For example, equivalent elements may be substituted for those illustrated and described herein (neodymium doped glass lasers could be used in place of ruby lasers 30 and 31); parts may be reversed; and certain features of the invention may be utilized independently of the use of other features, all without departing from the spirit or scope of the invention.

What is claimed is:
1. A device to aid in simultaneously determining the density, velocity and temperature of a streaming gas comprising:
   first and second lasers, calibrated for frequency and spectral distribution, with their energies directed into the same small region of said streaming gas;
   means for adjusting the frequency of said first laser to a frequency $f_1$;
   means for adjusting the frequency of said second laser to a frequency $f_2$ different from $f_1$;
   means for measuring and recording the magnitudes of the energy from said first and second lasers;
   receiving means, aimed at said small region of said gas, for receiving the $f_1-f_2$ laser energy in said small region scattered by the particles in said gas and converting the received scattered energy into a first electrical signal;
   analyzer means connected to said receiving means for producing a second electrical signal which is indicative of the magnitude, frequency and spectral distribution of said first electrical signal; and
   means for recording said second electrical signal whereby the density, velocity and temperature of said streaming gas can be determined from the calibrations of said lasers and said recordings.

References Cited

UNITED STATES PATENTS

| | | | |
|---|---|---|---|
| 3,277,396 | 10/1966 | Statz et al. | 332—16 |
| 3,329,821 | 7/1967 | Lesage | 250—206 |
| 3,339,073 | 8/1967 | Hunter | 250—199 |
| 3,353,115 | 11/1967 | Maiman | 331—94.5 |

OTHER REFERENCES

"Measurement of Free Air Stream Density by Means of a Laser Beam," Nudell et al., IEEE Internat. Space Electronics Symp. Rec. 2–E–1 to 2–E–7 (1964).

(Other references on following page)

"A New Method for the Determination of Plasma Electron Temperature and Density from Thompson Scattering of an Optical Maser Beam," T. P. Hughes, Nature, vol. 194, Apr. 21, 1962, pp. 268–269.

"Localized Fluid Flow Measurements with an He-Ne Laser Spectrometer," Yeh et al., Appl. Phys. Let'rs, vol. 4, No. 10, May, 1964 p.p. 176–8.

"Measurement of Localized Flow Velocities in Gases with a Laser Doppler Flowmeter," Foreman et al., Appl. Phys. Letters, vol. 7, No. 4, August 15, 1965, pp. 77–78.

"He-Ne Laser source for light scattering measurements," D. H. Woodward, Appl. Opt., Vol. 2, No 11, November 1963, pp. 1205–1207.

RONALD L. WIBERT, *Primary Examiner.*

R. J. WEBSTER, *Assistant Examiner.*

U.S. Cl. X.R.

250—43.5, 219; 331—94.5; 356—28